United States Patent
Park et al.

(10) Patent No.: US 9,814,030 B2
(45) Date of Patent: Nov. 7, 2017

(54) METHOD AND APPARATUS FOR TRANSMITTING OR RECEIVING REFERENCE SIGNAL IN WIRELESS COMMUNICATION SYSTEM

(71) Applicant: LG ELECTRONICS INC., Seoul (KR)

(72) Inventors: Hanjun Park, Anyang-si (KR); Kijun Kim, Anyang-si (KR); Jonghyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/431,223

(22) PCT Filed: Sep. 27, 2013

(86) PCT No.: PCT/KR2013/008678
§ 371 (c)(1),
(2) Date: Mar. 25, 2015

(87) PCT Pub. No.: WO2014/051374
PCT Pub. Date: Apr. 3, 2014

(65) Prior Publication Data
US 2015/0257132 A1 Sep. 10, 2015

Related U.S. Application Data

(60) Provisional application No. 61/706,132, filed on Sep. 27, 2012.

(51) Int. Cl.
*H04W 72/04* (2009.01)
*H04B 7/06* (2006.01)
(Continued)

(52) U.S. Cl.
CPC .......... *H04W 72/042* (2013.01); *H04B 7/068* (2013.01); *H04B 7/0684* (2013.01);
(Continued)

(58) Field of Classification Search
CPC .... H04B 7/0626; H04B 7/068; H04B 7/0684; H04L 5/0023; H04L 5/0048;
(Continued)

(56) References Cited

U.S. PATENT DOCUMENTS

2010/0074343 A1 3/2010 Gaal et al.
2010/0189058 A1 7/2010 Kawamura et al.
(Continued)

*Primary Examiner* — Khoa Huynh
(74) *Attorney, Agent, or Firm* — Birch, Stewart, Kolasch & Birch, LLP

(57) ABSTRACT

A method for transmitting a channel state information reference signal (CSI-RS) in a specific downlink subframe having an extended cyclic prefix (CP) in a wireless communication system according to an embodiment of the present invention includes: generating a CSI-RS sequence and mapping the CSI-RS sequence to CSI-RS complex-valued modulation symbols; and mapping the CSI-RS complex-valued modulation symbols to at least one pattern of a first CSI-RS pattern set composed of a plurality of CSI-RS patterns and a second CSI-RS pattern set composed of a plurality of CSI-RS patterns, the CSI-RS patterns being composed of REs to which CSI-RS complex-valued modulation symbols are mapped, wherein the second CSI-RS pattern set is available when 2 OFDM symbols are used for a physical downlink control channel in the downlink subframe or a specific downlink control information format is configured.

11 Claims, 13 Drawing Sheets

(51) Int. Cl.
*H04L 5/00* (2006.01)
*H04L 27/26* (2006.01)

(52) U.S. Cl.
CPC .......... *H04L 5/0048* (2013.01); *H04L 5/0053* (2013.01); *H04L 27/2601* (2013.01); *H04W 72/0446* (2013.01); *H04L 27/2602* (2013.01)

(58) Field of Classification Search
CPC ............... H04L 5/0053; H04L 27/2601; H04L 27/2602; H04L 27/261; H04W 72/042; H04W 72/0446
See application file for complete search history.

(56) References Cited

U.S. PATENT DOCUMENTS

| | | | |
|---|---|---|---|
| 2011/0170562 A1* | 7/2011 | Hu | H04L 5/0023 370/479 |
| 2011/0176634 A1* | 7/2011 | Yoon | H04L 5/0023 375/295 |
| 2011/0194551 A1* | 8/2011 | Lee | H04B 7/0626 370/342 |
| 2012/0020272 A1 | 1/2012 | Lee et al. | |
| 2012/0207199 A1 | 8/2012 | Guo et al. | |
| 2013/0034064 A1* | 2/2013 | Nam | H04W 72/1294 370/329 |
| 2013/0163499 A1* | 6/2013 | Cheng | H04J 11/0079 370/312 |

* cited by examiner

FIG. 5
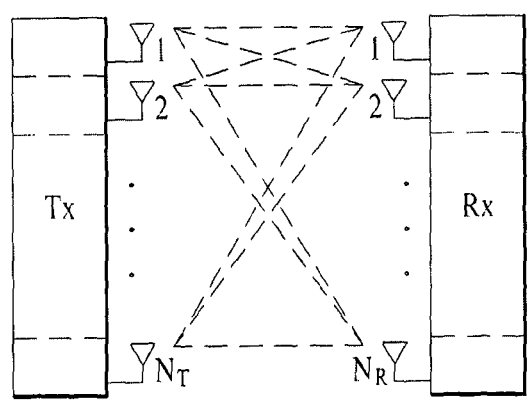
(a)
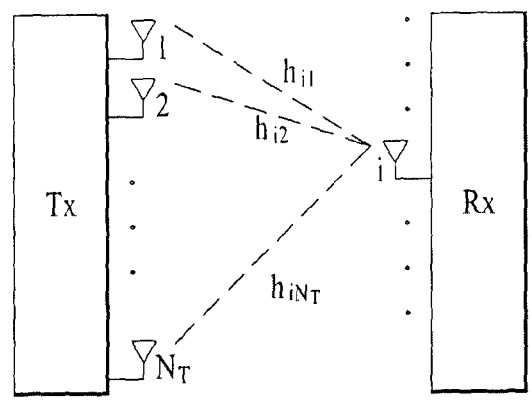
(b)

FIG. 7
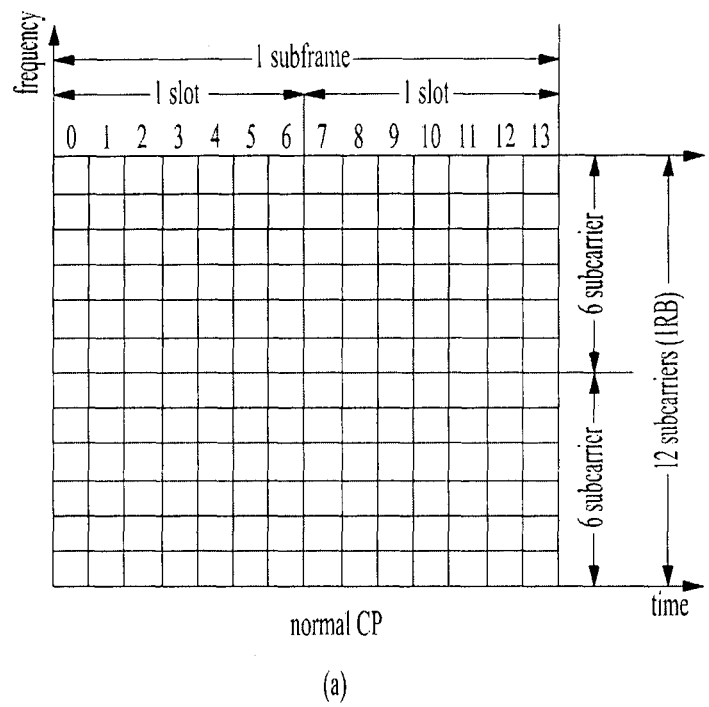
(a) normal CP
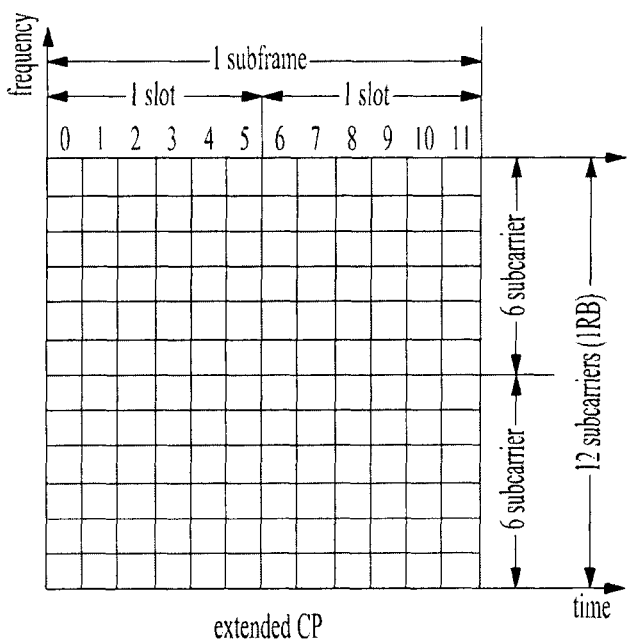
(b) extended CP

METHOD AND APPARATUS FOR TRANSMITTING OR RECEIVING REFERENCE SIGNAL IN WIRELESS COMMUNICATION SYSTEM

CROSS REFERENCE TO RELATED APPLICATIONS

This application is the National Phase of PCT International Application No. PCT/KR2013/008678, filed on Sep. 27, 2013, which claims priority under 35 U.S.C. 119(e) to U.S. Provisional Application No. 61/706,132, filed on Sep. 27, 2012, all of which are hereby expressly incorporated by reference into the present application.

TECHNICAL FIELD

The present invention relates to a wireless communication system, and more specifically, to a method and apparatus for transmitting or receiving a reference signal.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for allocating a resource for a reference signal in transmission of the reference signal.

Another object of the present invention is to provide a resource allocation method for a reference signal in a subframe to which an extended CP is applied in a massive MIMO environment.

The technical problems to be solved by the present invention are not limited to the above technical problems and those skilled in the art may understand other technical problems from the following description.

Technical Solution

In an aspect of the present invention, a method for transmitting a channel state information reference signal (CSI-RS) in a specific downlink subframe having an extended cyclic prefix (CP) in a wireless communication system includes: generating a CSI-RS sequence and mapping the CSI-RS sequence to CSI-RS complex-valued modulation symbols; and mapping the CSI-RS complex-valued modulation symbols to at least one pattern of a first CSI-RS pattern set composed of a plurality of CSI-RS patterns and a second CSI-RS pattern set composed of a plurality of CSI-RS patterns, the CSI-RS patterns being composed of REs to which CSI-RS complex-valued modulation symbols are mapped, wherein the second CSI-RS pattern set is available when 2 OFDM symbols are used for a physical downlink control channel in the downlink subframe or a specific downlink control information format is configured.

Preferably, the first CSI-RS pattern set and the second CSI-RS pattern set may be composed of a plurality of 8-antenna port CSI-RS patterns (referred to as "8-port patterns" hereinafter), a plurality of 4-antenna port CSI-RS patterns (referred to as "4-port patterns" hereinafter) and a plurality of 1- or 2-antenna port CSI-RS patterns (referred to as "1- or 2-port patterns" hereinafter), and the CSI-RS complex-valued modulation symbols may be mapped to at least one of the plurality of 8-port patterns, the plurality of 4-port patterns and the plurality of 1- or 2-port patterns.

Preferably, the first CSI-RS pattern set may be positioned in fifth and sixth OFDM symbols of each slot of a physical resource block (PRB) pair in the subframe, wherein each CSI-RS pattern of the first CSI-RS pattern set includes REs with 2 consecutive OFDM symbol indices from among REs with specific subcarrier indices k of each slot, the specific subcarrier indices k corresponding to 0, 2, 3, 5, 6, 8, 9 and 11 in a first slot and to 0, 1, 3, 4, 6, 7, 9 and 10 in a second slot.

Preferably, when 2 OFDM symbols are used for a physical downlink control channel in the downlink subframe, the second CSI-RS pattern set may be positioned in third and fourth OFDM symbols of the first slot of a PRB pair in the subframe and at least 2 consecutive OFDM symbols from among sixth to ninth OFDM symbols of the second slot of the PRB pair, wherein each CSI-RS pattern of the second CSI-RS pattern set includes REs with 2 consecutive OFDM symbol indices in all subcarriers of each slot.

Preferably, when the specific downlink control information format is configured, the second CSI-RS pattern set may be positioned in fifth and sixth OFDM symbols of each slot of a PRB pair in the subframe, wherein each CSI-RS pattern of the second CSI-RS pattern set includes REs with 2 consecutive OFDM symbol indices from among REs with specific subcarrier indices k of each slot, the specific subcarrier indices k corresponding to 1, 4, 7 and 10 in a first slot and to 2, 5, 8 and 11 in a second slot.

Preferably, the method may further include transmitting information on the specific downlink subframe to a UE.

Preferably, the method may further include transmitting information on CSI-RS patterns to which the CSI-RS complex-valued modulation symbols are mapped to a UE.

Preferably, the first CSI-RS pattern set may be used for CSI-RS transmission through 32 or fewer antenna ports.

Preferably, the second CSI-RS pattern set may be used for CSI-RS transmission through 33 or more antenna ports.

Preferably, the method may further include transmitting information on the number of CSI-RS antenna ports used for CSI-RS transmission to a UE.

In another aspect of the present invention, a method for receiving a CSI-RS in a specific downlink subframe having an extended CP in a wireless communication system includes: receiving CSI-RS complex-valued modulation symbols mapped to at least one pattern of a first CSI-RS pattern set composed of a plurality of CSI-RS patterns and a second CSI-RS pattern set composed of a plurality of CSI-RS patterns, wherein the CSI-RS patterns are composed of REs to which CSI-RS complex-valued modulation symbols are mapped and a CSI-RS sequence is mapped to the CSI-RS complex-valued modulation symbols, wherein the second CSI-RS pattern set is available when 2 OFDM symbols are used for a physical downlink control channel in the downlink subframe or a specific downlink control information format is set.

In another aspect of the present invention, an eNB configured to transmit a CSI-RS in a specific downlink subframe having an extended CP in a wireless communication system includes: a radio frequency (RF) unit; and a processor configured to control the RF unit, wherein the processor is configured to generate a CSI-RS sequence, to map the CSI-RS sequence to CSI-RS complex-valued modulation symbols and to map the CSI-RS complex-valued modulation symbols to at least one pattern of a first CSI-RS pattern set composed of a plurality of CSI-RS patterns and a second CSI-RS pattern set composed of a plurality of CSI-RS patterns, wherein the CSI-RS patterns are composed of REs to which CSI-RS complex-valued modulation symbols are mapped, wherein the second CSI-RS pattern set is available when 2 OFDM symbols are used for a physical downlink control channel in the downlink subframe or a specific downlink control information format is configured.

In another aspect of the present invention, a UE configured to receive a CSI-RS in a specific downlink subframe having an extended CP in a wireless communication system includes: a radio frequency (RF) unit; and a processor configured to control the RF unit, wherein the processor is configured to receive CSI-RSs corresponding to CSI-RS complex-valued modulation symbols mapped to at least one pattern of a first CSI-RS pattern set composed of a plurality of CSI-RS patterns and a second CSI-RS pattern set composed of a plurality of CSI-RS patterns, wherein the CSI-RS complex-valued modulation symbols are mapped to a CSI-RS sequence and the CSI-RS patterns are composed of REs to which CSI-RS complex-valued modulation symbols are mapped, wherein the second CI-RS pattern set is available when 2 OFDM symbols are used for a physical downlink control channel in the downlink subframe or a specific downlink control information format is configured.

The above description corresponds to part of embodiments of the present invention and various embodiments reflecting technical characteristics of the present invention are derived and understood by those skilled in the art on the basis of the following detailed description of the present invention.

Advantageous Effects

According to an embodiment of the present invention, demodulation/decoding performance of a UE can be improved through reference signal allocation.

In addition, according to an embodiment of the present invention, a reference signal can be transmitted in a subframe in which reference signal transmission is limited and an extended CP is applied through multiple antenna ports, thereby supporting a massive MIMO system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a MIMO (Multiple-Input Multiple-Output) system used in 3GPP LTE/LTE-A;

FIG. 7 illustrates a subframe structure used in 3GPP LTE/LTE-A;

BEST MODE

Figure 1:
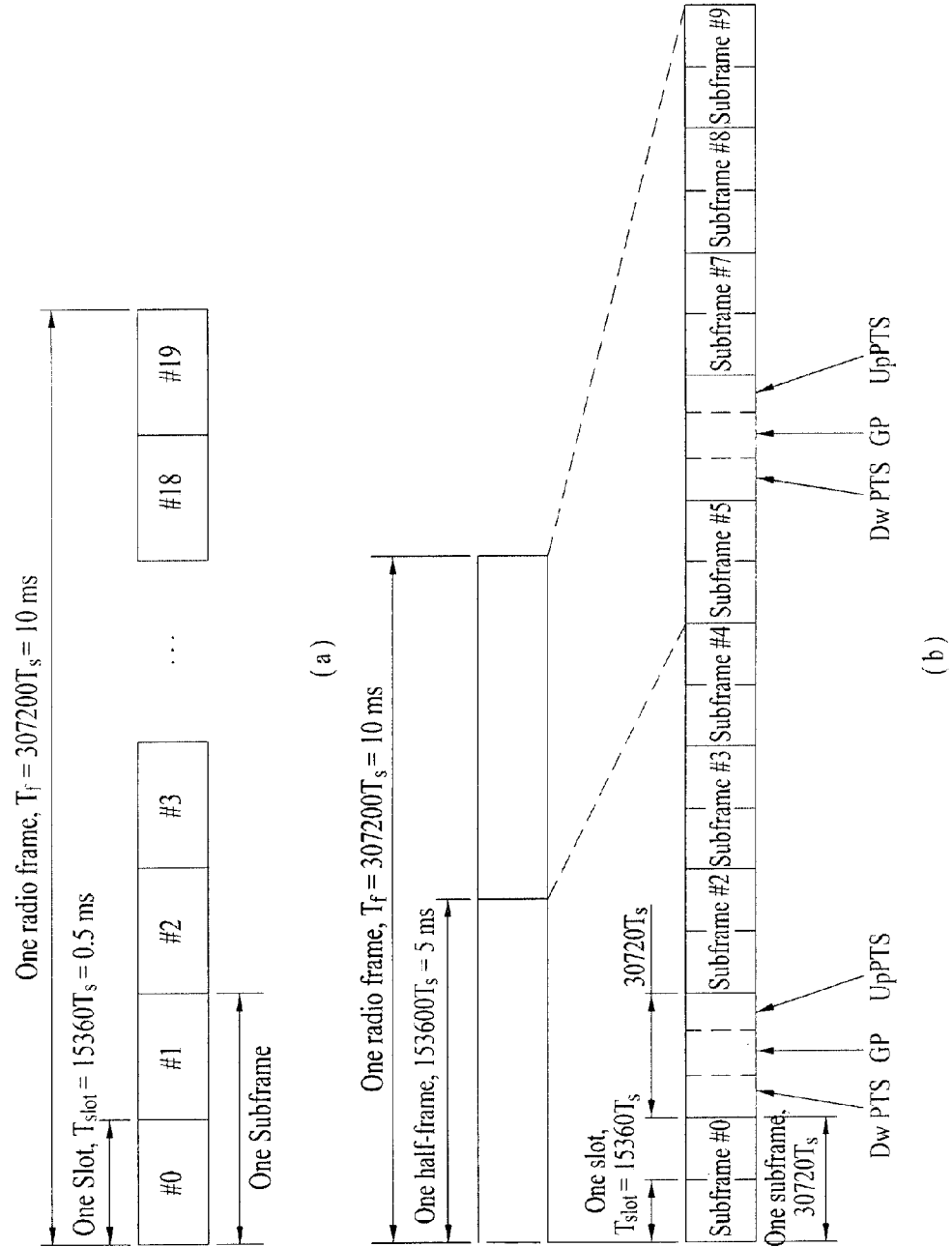
FIG. 1 illustrates an exemplary radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config- uration | Downlink- to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

0 to $N_{symb}^{DL/UL} * N_{sc}^{RB} - 1$ in the frequency domain and 1 is an index in the range of 0 to $N_{symb}^{DL/UL} - 1$.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS ee | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
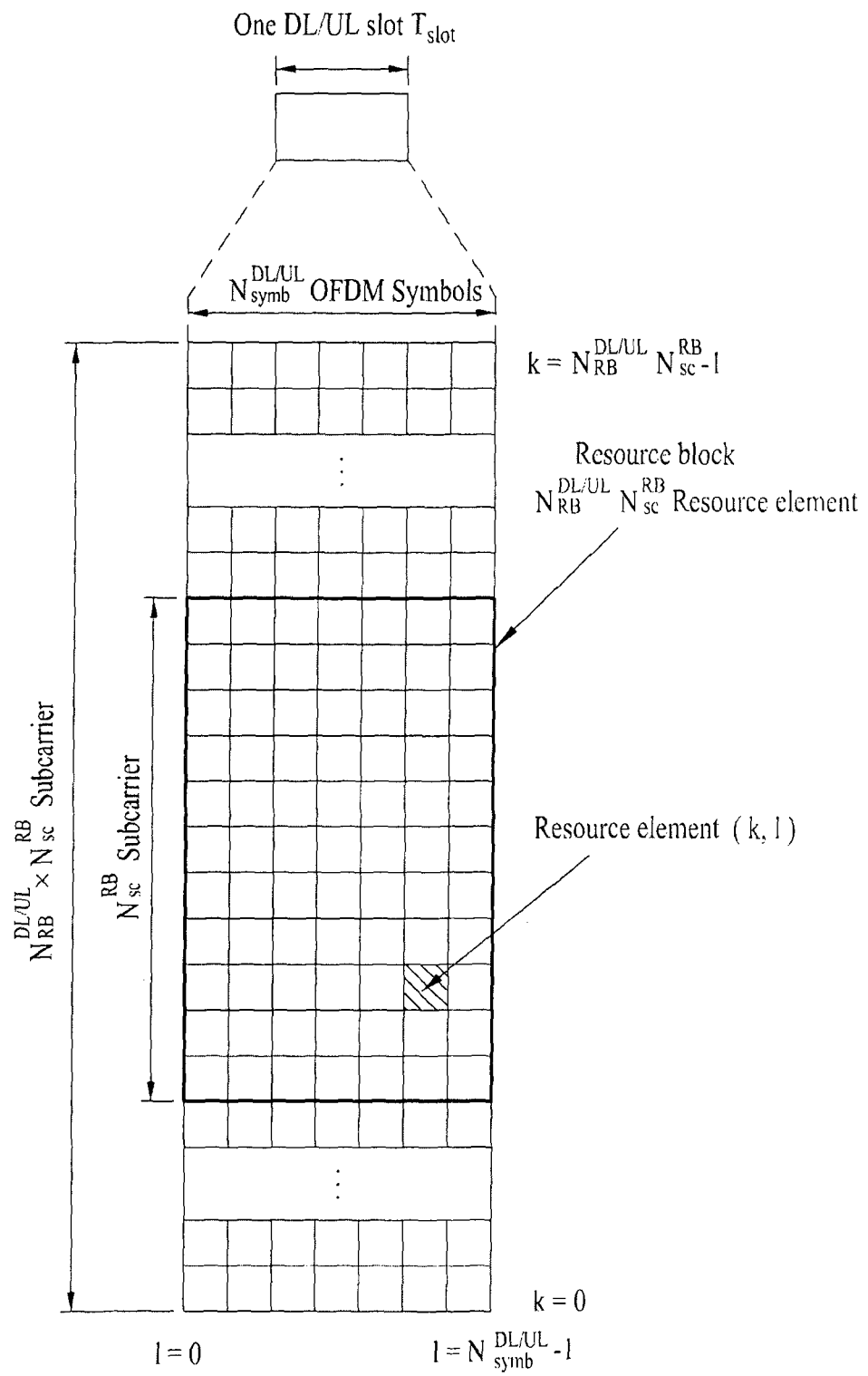
FIG. 2 illustrates an exemplary downlink/uplink (DL/UL) slot structure used in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, RB denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
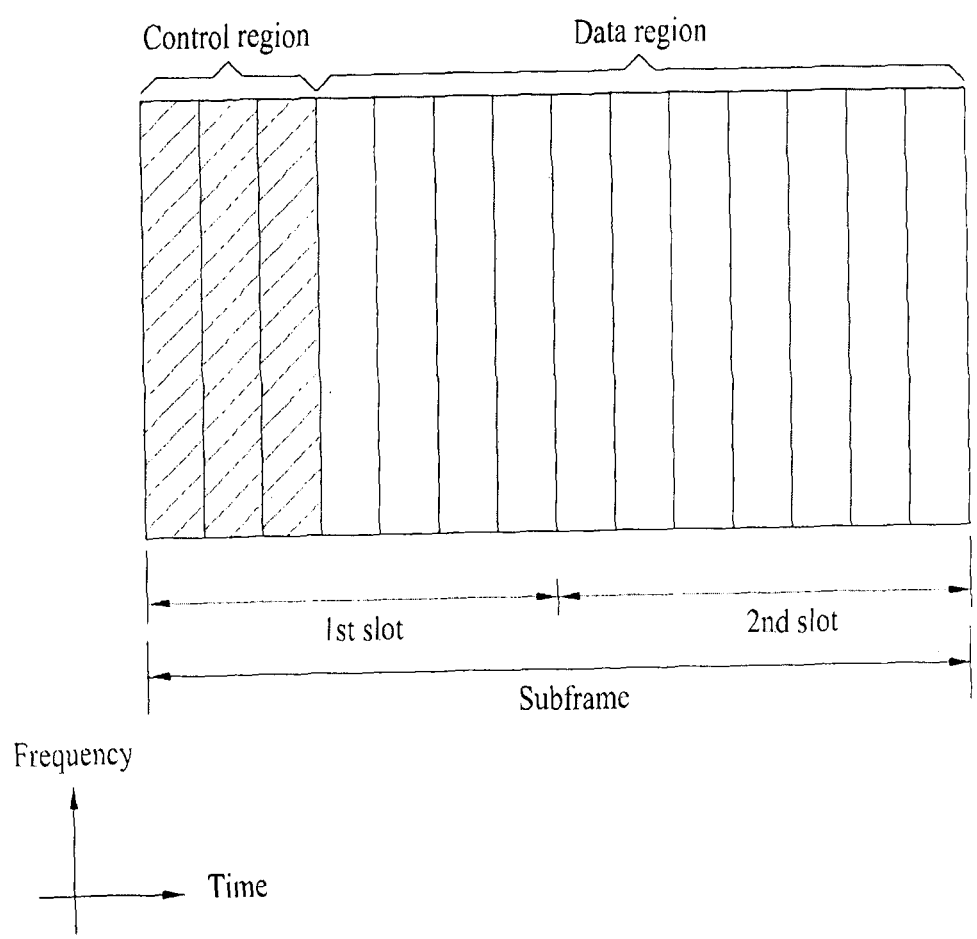
FIG. 3 illustrates an exemplary downlink subframe structure used in 3GPP LTE/LTE-A.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (HACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
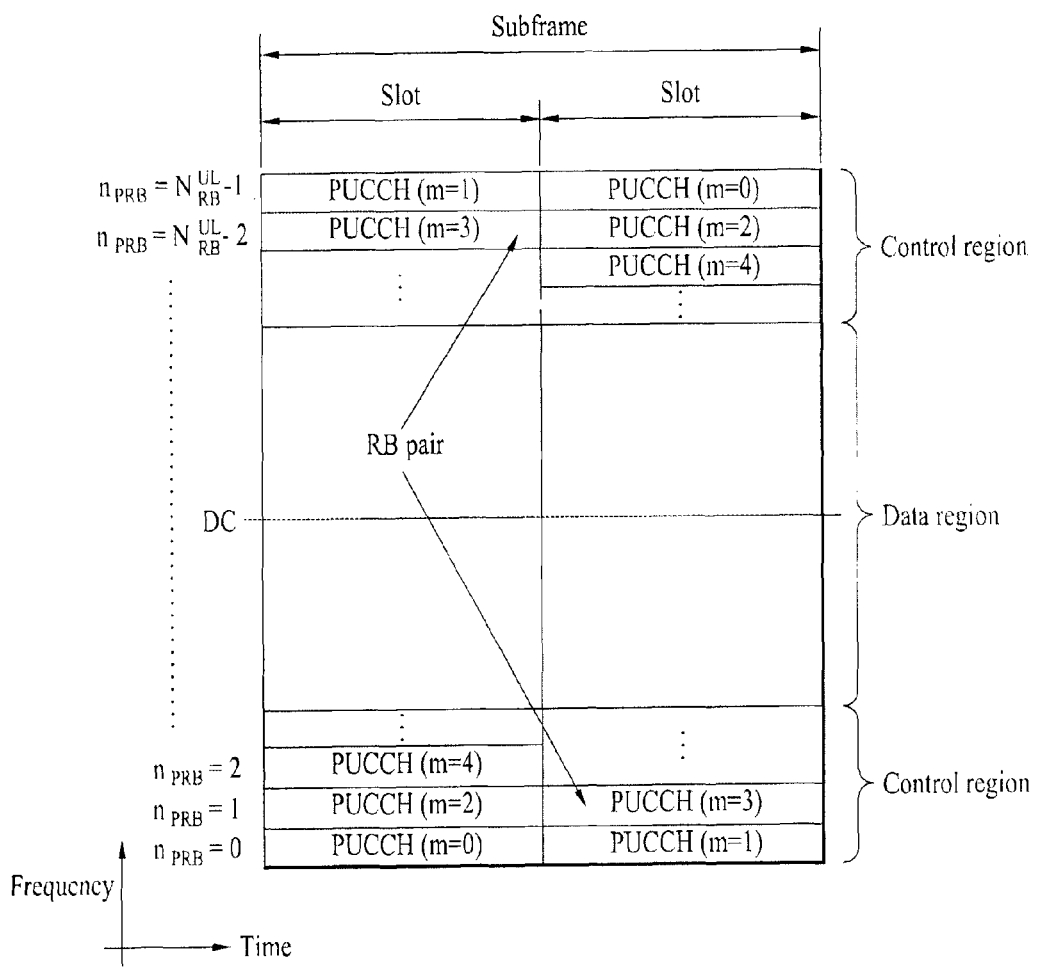
FIG. 4 illustrates an exemplary uplink subframe structure used in 3GPP LTE/LTE-A.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

FIG. 5 illustrates configurations of wireless communication systems including multiple antennas.

Referring to FIG. 5(a), when the number of Tx antennas and the number of Rx antennas are respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$S = [S_1, S_2, \ldots, S_{N_T}]^T \quad \text{[Equation 2]}$$

A different transmission power may be applied to each piece of transmission information, $S_1, S_2, \ldots, S_{N_T}$. Let the transmission power levels of the transmission information be denoted by $P_1, P_2, \ldots, P_{N_T}$, respectively. Then the transmission power-controlled transmission information vector is given as $$\hat{S} = [\hat{S}_1, \hat{S}_2, \ldots, \hat{S}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5. Herein, $w_{ij}$ denotes a weight between an ith Tx antenna and a jth piece of information. W is called a weight matrix or a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Here, $w_{ij}$ denotes a weight between an i-th Tx antenna and j-th information. W is also called a precoding matrix.

Given NR Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a j-th Tx antenna and an i-th Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an i-th Rx antenna. The channels may be represented as vectors and matrices by grouping them. As illustrated in FIG. 5(b), channels from the $N_T$ Tx antennas to an i-th Rx antenna may be expressed as follows.

$$h_i^T = [h_{i1}, h_{i2}, \ldots, h_{iN_T}]$$ [Equation 7]

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix}$$ [Equation 8]

Actual channels experience the above channel matrix H and then are added with Additive white Gaussian noise (AWGN). The AWGN $n_1, n_2, \ldots n_{N_R}$ added to nthe NR Rx antennas is given as the following vector.

$$n = [n_1, n_2, \ldots, n_{N_R}]^T$$ [Equation 9]

From the above modeled equations, the received signal is given as $$y = \begin{bmatrix} y_1 \\ y_2 \\ \vdots \\ y_i \\ \vdots \\ y_{N_R} \end{bmatrix}$$ [Equation 10]

$$= \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R)$$ [Equation 11]

If the matrix is eigenvalue-decomposed, its rank may be defined as the number of non-zero eigenvalues. Similarly, in case of singular value decomposition (SVD), the rank may be defined as the number of non-zero singular values. Therefore, the rank of a channel matrix physically means the maximum number of different pieces of information that can be transmitted on given channels.

Reference signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Massive MIMO

Wireless communication systems following LTE Rel-12 consider introduction of an active antenna system (AAS). AAS refers to a system configured such that each antenna includes an active element such as an amplifier, distinguished from a conventional passive antenna system in which an amplifier capable of adjusting the phase and amplitude of a signal is separated from an antenna. The AAS does not need a cable, a connector, other hardware devices, etc. to connect an amplifier to an antenna since an active antenna is used, and thus the AAS is efficient in terms of energy and cost. Particularly, since the AAS supports electronic beam control per antenna, the AAS enables enhanced MIMO capable of forming an accurate beam pattern or a 3D beam pattern in consideration of beam direction and beam width.

Massive MIMO having a plurality of input/output antennas and a multi-dimensional antenna structure is also considered owing to introduction of an enhanced antenna system such as AAS. For example, a two-dimensional antenna array enables active antennas of an AAS to generate a 3-dimensional beam pattern. When the 3-dimensional beam pattern is used, a transmit antenna can perform quasi-static or dynamic beam formation in the vertical direction as well as the horizontal direction of a beam. For example, an application of formation of a sector in the vertical direction can be considered. From the viewpoint of a receive antenna, a signal power increase due to an antenna array gain can be expected when a reception beam is formed using a large-scale receive antenna. Accordingly, an eNB can receive a signal transmitted from a UE through a plurality of antennas on uplink and the UE can set transmit power thereof to a very low level in consideration of the gain of the large-scale receive antenna in order to reduce the influence of interference.

Figure 6:
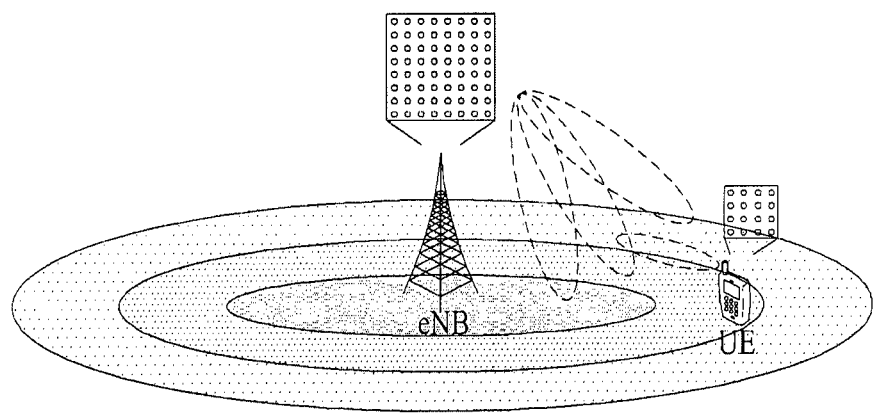
FIG. 6 illustrates a massive antenna based wireless communication system.

FIG. 6 illustrates a system in which an eNB or a UE has a plurality of transmit/receive antennas capable of forming an AAS based 3-dimensional beam.

The present invention proposes a method for increasing the number of antenna ports through which a channel state information reference signal (CSI-RS) is transmitted in a subframe to which an extended CP is applied in a massive MIMO wireless communication system. In addition, the present invention proposes a scheme of using existing resource elements (REs) allocated to a CSI-RS or a CSI-RS pattern in which new REs are subframe-specifically added in order to increase the number of antenna ports for a CSI-RS in a subframe to which an extended CP is applied.

3GPP LTE adopts orthogonal frequency division multiplexing (OFDM) that supports efficient operation of frequency resources based on orthogonal subcarriers. When OFDM symbols are sequentially transmitted in a radio channel environment, interference may be generated between OFDM symbols due to multi-path delay of a channel. LTE provides a CP in front of an OFDM symbol to avoid delay of signals of previously transmitted OFDM symbols in order to prevent interference between OFDM symbols. For validity of the CP, a CP length needs to be greater than channel delay spread. The channel delay spread may depend on an environment within which the corresponding network is installed. For example, the delay spread has a relatively small value in an environment having a small number of obstacles, whereas the delay spread has a relatively large value in an environment having a large number of obstacles. Accordingly, LTE defines a normal CP and an extended CP in consideration of the fact that channel delay spread depends on environment and applies the extended CP having a relatively long CP length to an environment having a relatively long delay spread. Here, as CP length increases, the length of an OFDM symbol carrying data is also increased in general in order to minimize inefficiency of time resources due to use of the CP. Accordingly, the number of OFDM symbols in a resource block (RB) depends on whether the normal CP or extended CP is applied because OFDM Symbol length is increased when the extended CP is applied, as described above, and thus the number of OFDM symbols that can be included in a predetermined subframe decreases. FIG. 7 illustrates RB pairs for a normal CP and an extended CP in LTE.

Figure 8:
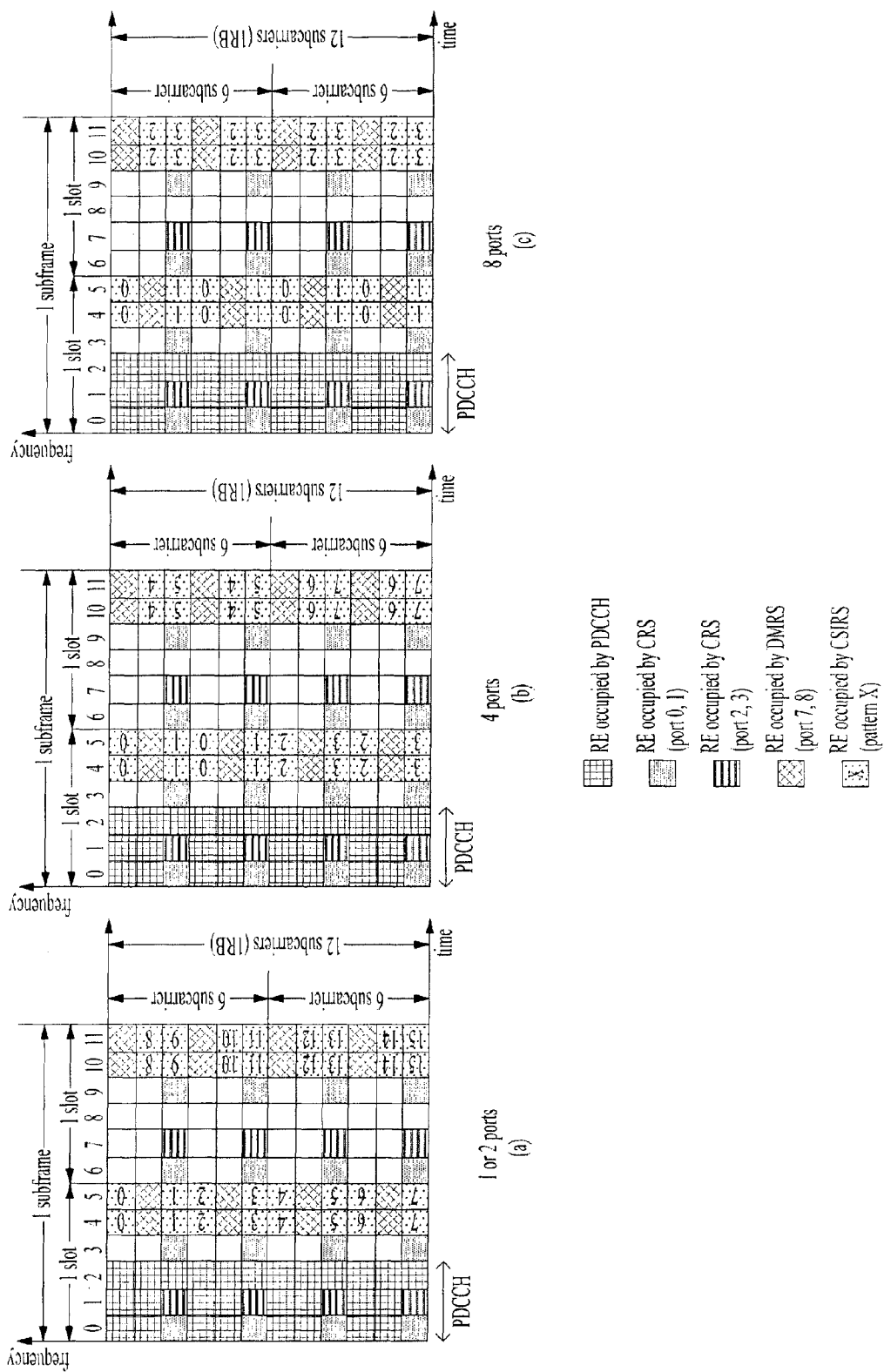
FIG. 8 illustrates a CRS (Cell-specific Reference Signal) pattern, a DMRS (Demodulation Reference Signal) pattern, a PDCCH region and a CSI-RS pattern of a downlink subframe having an extended CP.

In 3GPP LTE, channel quality information (CQI) composed of a rank indicator (RI), a precoding matrix indicator (PMI) and a channel quality indicator (CQI) is fed back from a UE in order to determine precoding for supporting MIMO. The CSI is estimated through a cell specific reference signal (CRS) in LTE Rel-8, whereas a CSI-RS is introduced and used for CSI estimation in systems following LTE Rel-9/10. The CSI-RS is configured through a signal of a higher layer such as RRC and higher layer signals of antennaPortCount, resourceConfig, Pc and subframeConfig are delivered in order to set the number of antenna ports through which the CSI-RS is transmitted, a resource region in which the CSI-RS is transmitted, CSI RS transmit power, and a CSI-RS transmission subframe period and offset. Even in a subframe to which an extended CP is applied, as shown in FIG. 7, the CSI-RS can be transmitted. FIG. 8 illustrates a CSI-RS pattern that can be transmitted through 8 antenna ports in a subframe to which an extended CP is applied.

CSI-RS will now be described in more detail.

FIG. 8 illustrates a CSI-RS mapping pattern when the number of CSI-RS ports is 8. An antenna port through which a CSI-RS is transmitted is referred to as a CSI-RS port and positions of resources in a predetermined resource region in which corresponding CSI-RS(s) are transmitted through CSI-RS port(s) are referred to as a CSI-RS pattern or a CSI-RS configuration. In addition, a resource element (RE) used for CSI-RS transmission is referred to as a CSI-RS RE. While the position of an RE in which a CRS is transmitted per antenna port is fixed in the case of CRS, CSI-RS has a maximum of 32 different configurations in order to reduce inter-cell interference (ICI) in multi-cell environments including a hetero-network environment. CSI-RS configuration depends on the number of antenna ports in a cell and a CSI-RS is configured such that neighboring cells have different CSI-RS configurations. CSI-RS supports a maximum of 8 antenna ports (p=15, p=15, 16, p=15, . . . , 18 and p=15, . . . , 22), differently from CRS, and is defined for Δf=15 kHz only. Antenna ports p=15, . . . , 22 can respectively correspond to CSI-RS ports p=0, . . . , 7 in the following description.

Tables 4 and 5 show CSI-RS configurations that can be used in an FDD (frequency division duplex) subframe structure (referred to as FS-1 hereinafter) and a TDD (time division duplex) frame structure (referred to as FS-2 hereinafter). Particularly, Table 4 shows CSI-RS configurations in a subframe having a normal CP and Table 5 shows CSI-RS configurations in a subframe having an extended CP.

TABLE 4

| CSI-RS | Number of CSI-RSs configured | | | | | |
|---|---|---|---|---|---|---|
| config- | 1 or 2 | | 4 | | 8 | |
| uration | (k', l') | $n_s$mod2 | (k', l') | $n_s$mod2 | (k', l') | $n_s$mod2 |
| FS-1 0 | (9, 5) | 0 | (9, 5) | 0 | (9, 5) | 0 |
| and 1 | (11, 2) | 1 | (11, 2) | 1 | (11, 2) | 1 |
| FS-2 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |

TABLE 4-continued

| CSI-RS | Number of CSI-RSs configured | | | | | |
|---|---|---|---|---|---|---|
| config- | 1 or 2 | | 4 | | 8 | |
| uration | (k', l') | n_s mod2 | (k', l') | n_s mod2 | (k', l') | n_s mod2 |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |
| FS-2 only 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 5

| CSI-RS | Number of CSI-RSs configured | | | | | |
|---|---|---|---|---|---|---|
| config- | 1 or 2 | | 4 | | 8 | |
| uration | (k', l') | n_s mod2 | (k', l') | n_s mod2 | (k', l') | n_s mod2 |
| FS-1 and FS-2 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| FS-2 only 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

When (k', l') (k' being a subcarrier index in a resource block and l' being an OFDM symbol index in a slot) and $n_s$ (slot index in a frame) of Table 4 or 5 are applied to the following equation, a time-frequency resource used by each CSI-RS port for transmission of a corresponding CSI-RS can be determined. That is, in slot $n_s$ of a subframe (CSI-RS subframe hereinafter) configured for CSI-RS transmission, a CSI-RS sequence can be mapped to complex-valued modulation symbols $a^{(p)}_{k,l}$ used as reference symbols on CSI-RS port p according to the following equation.

$$a^{(p)}_{k,l} = w_{l''} \cdot r_{l,n_s}(m')$$ [Equation 12]

In Equation 12, a resource index pair (k, l) (k being a subcarrier index, l being an OFDM symbol index in a subframe) used by the CSI-RS port p for CSI-RS transmission can be determined by the following equation.

$$k = k' + 12m + \begin{cases} -0 & \text{for } p \in \{0, 1\}, \text{ normal cyclic prefix} \\ -6 & \text{for } p \in \{2, 3\}, \text{ normal cyclic prefix} \\ -1 & \text{for } p \in \{4, 5\}, \text{ normal cyclic prefix} \\ -7 & \text{for } p \in \{6, 7\}, \text{ normal cyclic prefix} \\ -0 & \text{for } p \in \{0, 1\}, \text{ extended cyclic prefix} \\ -3 & \text{for } p \in \{2, 3\}, \text{ extended cyclic prefix} \\ -6 & \text{for } p \in \{4, 5\}, \text{ extended cyclic prefix} \\ -9 & \text{for } p \in \{6, 7\}, \text{ extended cyclic prefix} \end{cases}$$ [Equation 13]

$$l = l' + \begin{cases} l'' & \text{CSI reference signal configurations } 0\text{-}19, \text{ normal cyclic prefix} \\ 2l'' & \text{CSI reference signal configurations } 20\text{-}31, \text{ normal cyclic prefix} \\ l'' & \text{CSI reference signal configurations } 0\text{-}27, \text{ extended cyclic prefix} \end{cases}$$

$$w_{l''} = \begin{cases} 1 & p \in \{0, 1, 2, 3\} \\ (-1)^{l''} & p \in \{4, 5, 6, 7\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

FIG. 8 illustrates CSI-RS configurations in a specific subframe having an extended CP. Particularly, FIG. 8 shows positions of resources occupied by CSI-RSs in an RB pair based on CSI-RS configurations according to Equations 12 and 13 and Table 5.

FIG. 8(*a*) illustrates 16 CSI-RS configurations available for 1 or 2 CSI-RS ports, FIG. 8(*b*) illustrates 8 CSI-RS configurations available for 4 CSI-RS ports and FIG. 8(*c*) illustrates 4 CSI-RS configurations available for 8 CSI-RS ports. Each CSI-RS configuration may be assigned a number based on the number of CSI-RS ports. When the number of CSI-RS ports configured for a specific cell is 8, the 8 CSI-RS ports transmit CSI-RSs on resources of a CSI-RS configuration for the specific cell from among the 4 CSI-RS configurations shown in FIG. 8.

Here, an orthogonal cover code (OCC) is applied to 2 OFDM symbols of a CSI-RS and 2 CSI-RS ports are discriminated from each other according to CDM. Accordingly, 2 RSs share 2 REs, discriminated from each other by an OCC and transmitted. For example, REs #0 and #1 correspond to CSI-RS ports #0 and #1. Representation of CSI-RS ports #0 and #1 is used for convenience of description and CSI-RS ports #0 and #1 can be represented as ports #15 and #16 to discriminate CSI-RS from other types of RSs such as CRS and other UE-specific RSs.

CSI-RS configurations have a nested property. The nested property is that a CSI-RS configuration for a larger number of CSI-RS ports is a super set of a CSI-RS configuration for a small number of CSI-RS ports. Referring to FIGS. 8(*a*) and 8(*b*), REs corresponding to a CSI-RS configuration for 4 CSI-RS ports are included in REs corresponding to a CSI-RS configuration for 8 CSI-RS ports, for example.

A plurality of CSI-RSs can be used in a predetermined cell. In the case of non-zero power CSI-RS, only a CSI-RS for one configuration is transmitted. In the case of zero power CSI-RS, CSI-RSs for a plurality of configurations can be transmitted. A UE assumes zero transmit power for resources other than resources assumed to be non-zero power CSI-RSs, from among resources corresponding to zero power CSI-RSs. For example, a CSI-RS is not transmitted in a special subframe in which downlink transmission and uplink transmission coexist, a subframe in which a paging message is transmitted and a subframe in which transmission of a synchronization signal and a PBCH (physical broadcast channel) or SIB1 (system information block type 1) collides with transmission of a CSI-RS in a radio frame for TDD, and the UE assumes that a CSI-RS is not transmitted in these subframes. A time-frequency resource used by a CSI-RS port for CSI-RS transmission is not used for PDSCH transmission through any antenna port and is not used for CSI-RS transmission through an antenna port other than the CSI-RS port.

Since time-frequency resources used for CSI-RS transmission cannot be used for data transmission, throughput decreases as CSI-RS overhead increases. In view of this, CSI-RS is configured such that the CSI-RS is transmitted at a predetermined interval corresponding to a plurality of subframes instead of being configured such that the CSI-RS is transmitted in every subframe. In this case, CSI-RS transmission overhead can be remarkably reduced. In the following description, a subframe configured for CSI-RS transmission is referred to as a CSI-RS subframe. A CSI-RS subframe can be defined by CSI-RS transmission periodicity and subframe offset. The CSI-RS transmission periodicity and subframe offset are called a CSI-RS subframe configuration. Table 6 shows CSI-RS transmission periodicity $T_{CSI-RS}$ and subframe offset $\Delta_{CSI-RS}$.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

In Table 6, $I_{CSI-RS}$ denotes CSI-RS transmission periodicity and subframe offset.

A BS determines or adjusts $I_{CSI-RS}$ and can transmit the same to UEs within the coverage of the corresponding cell. A UE can be aware of a CSI-RS in which a CSI-RS of a cell (referred to as a serving cell hereinafter) providing communication service to the UE is transmitted. The UE can determine a subframe that satisfies the following equation as a CSI-RS subframe.

$(10n_f + \lfloor n_s/2 \rfloor - \Delta_{CSI-RS}) \bmod T_{CSI-RS} = 0$ [Equation 14]

Here, $n_f$ denotes a system frame number and $n_s$ denotes a slot number of a radio frame.

Referring to FIG. 6, if $I_{CSI-RS}$ is in the range of 5 to 14, a CSI-RS is transmitted for every 10 subframes starting at a subframe corresponding to subframe number ($I_{CSI-RS}$−5).

The BS can inform a UE of the following parameters through higher layer signaling (e.g. medium access control (MAC) signaling or radio resource control (RRC) signaling).

Number of CSI-RS ports
CSI-RS configuration (refer to Tables 4 and 5, for example)
CSI-RS subframe configuration (refer to Table 6, for example)
CSI-RS subframe configuration period $T_{CSI-RS}$
CSI-RS subframe offset $\Delta_{CSI-RS}$ The BS can inform the UE of a CSI-RS configuration transmitted with zero power and a subframe configuration for transmission of a zero power CSI-RS as necessary. CSI-RS configurations of Tables 4 and 5 can be used as zero power CSI-RS configurations and CSI-RS subframe configurations of Table 6 can be used as subframes for transmission of a zero power CSI-RS.

Upon transmission of the above parameters to the UE, the UE can be aware of transmission of a corresponding CSI-RS from the BS. However, the CSI-RS is not transmitted under the following conditions in practice.

in a special subframe when frame structure type 2 (i.e. TDD system) is used
in a subframe in which CSI-RS transmission may collide with transmission of synchronization signals, PBCH or system information block type 1 (SIB1) messages
in a subframe configured for paging message transmission by a primary cell for a UE having a cell-specific paging configuration.

LTE supports a maximum of 8 spatial layers, whereas systems following LTE Rel-12 consider introduction of massive MIMO supporting 9 or more spatial layers in order to improve throughput. To efficiently use massive MIMO, correct CSI estimation for channels generated by a plurality of antennas needs to be performed. However, CSI estimation is performed using a CSI-RS transmitted as illustrated in FIG. 8 in LTE Rel-10. Since the CSI-RS resource shown in FIG. 8 has been designed for a maximum of 8 antenna ports, a CSI-RS resource configuration scheme or an extended CSI-RS pattern when 9 or more antenna ports are present is needed. When an extended CP is applied, particularly, the number of available REs is less than the number of available REs in a normal CP case and thus resource restriction may occur in design of the extended CSI-RS pattern. Accordingly, the present invention proposes a method of using existing REs or extending a CSI-RS pattern by adding new REs in a subframe that satisfies a specific condition when CSI-RSs are transmitted through 9 or more antenna ports.

First Embodiment—Method of Using Existing REs for a CSI-RS

Figure 9:
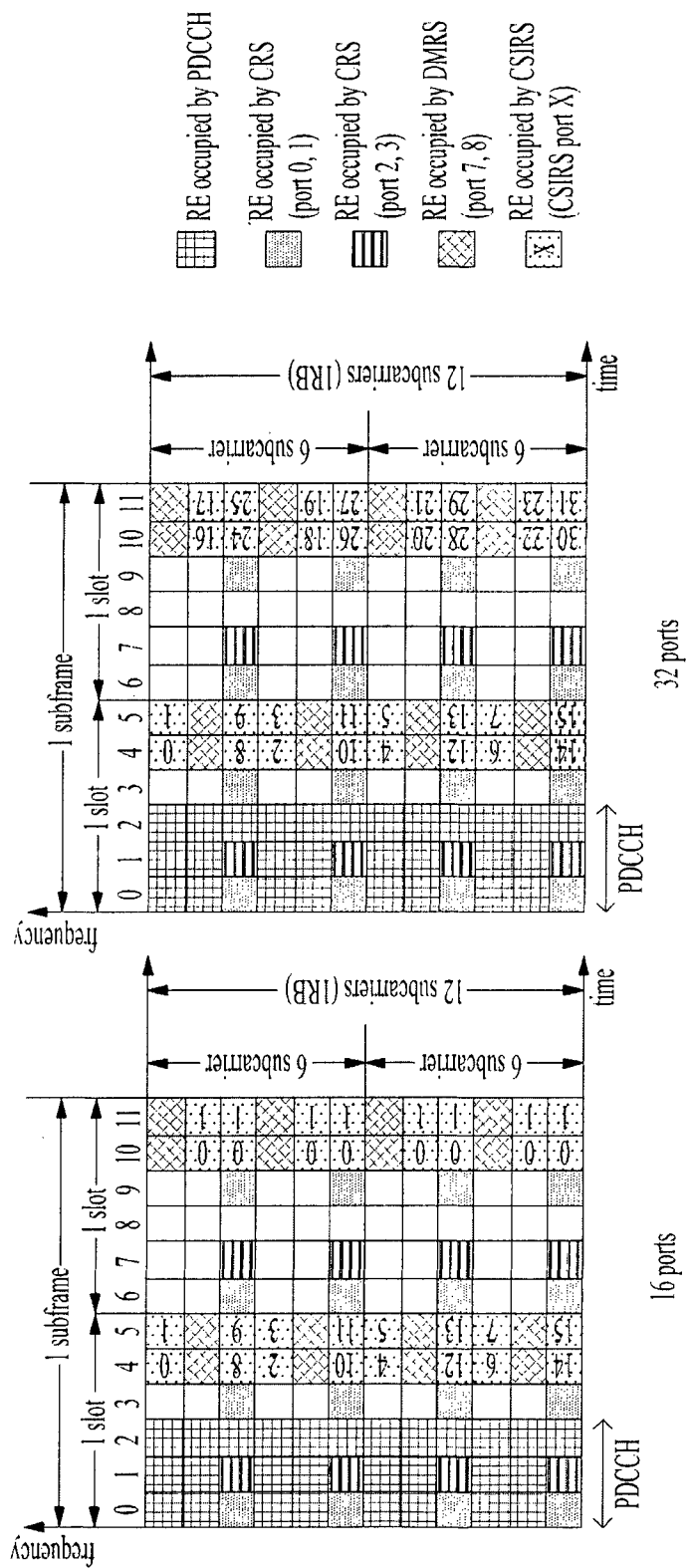
FIG. 9 illustrates a CSI-RS pattern of a normal downlink subframe having an extended CP according to an embodiment of the present invention.

A method for increasing the number of CSI-RS antenna ports in a single subframe using existing CSI-RS REs is proposed according to an embodiment of the present invention. In the CSI-RS pattern illustrated in FIG. 8, a basic resource unit capable of representing 1 or 2 antenna ports by an OCC for 2 OFDM symbols and an additional antenna port is discriminated by the basic resource unit according to FDM. Referring to FIGS. 5 and 8, the basic resource unit capable of representing 1 or 2 antenna ports allocated to a CSI-RS in a single subframe to which the extended CP of LTE is applied can be divided into a maximum of 16 patterns according to FDM so as to represent a maximum of 2*16=32 antenna ports. Here, a method for informing a UE of REs corresponding to a CSI-RS supporting N (>8) antenna ports can be considered. A method of simply determining several useful antenna ports and then deciding a CSI-RS pattern for the number of antenna ports can be considered. For example, when 16 antenna ports and 32 antenna ports are added to the CSI-RS pattern illustrated in FIG. 8, extended patterns as illustrated in FIG. 9 can be pre-defined. Here, the 16-antenna port pattern is not limited to FIG. 9 and may be composed of 2 patterns each having 8 antenna ports.

However, when a CSI-RS pattern having a number of CSI-RS ports, which is a multiple of 8, is defined as described above, CSI-RS resources may be wasted for specific CSI-RS antenna port values. If only the CSI-RS patterns as illustrated in FIG. 9 are present, the CSI-RS pattern defined for 16 antenna ports in FIG. 9 needs to be used when CSI-RSs are transmitted through 12 antenna ports because a CSI-RS pattern for 12 antenna ports is not present. In this case, 4 CSI-RS antenna ports are not used, causing resource waste. Accordingly, it is possible to directly inform the UE of patterns used for N antenna ports, from among the above-described 16 patterns, to support various numbers (e.g. 2, 4, . . . , 30, 32) of antenna ports through other methods. For example, a resource region can be signaled through a bitmap having a 16-bit length. Otherwise, a resource region can be signaled through a combination of an 8-antenna port pattern, a 4-antenna port pattern and a 2-antenna port pattern. When a combination of antenna port patterns is signaled to the UE, the following 4 cases may be present.

Case in which m 8-antenna port patterns are used:

$$_4C_1 + {}_4C_2 + {}_4C_3 + {}_4C_4 = 15$$

Case in which m 8-antenna port patterns and a single 4-antenna port pattern are used:

$$_4C_1^* {}_{(4-1)*2}C_1 + {}_4C_2^* {}_{(4-2)*2}C_1 + {}_4C_3^* {}_{(4-3)*2}C_1 = 56$$

Case in which m 8-antenna port patterns and a single 2-antenna port patterns are used:

$$_4C_1^* {}_{(4-1)*4}C_1 + {}_4C_2^* {}_{(4-2)*4}C_1 + {}_4C_3^* {}_{(4-3)*4}C_1 = 112$$

Case in which m 8-antenna port patterns, a single 4-antenna port pattern and a single 2-antenna port patterns are used:

$$_4C_1^* {}_{(4-1)*2}C_1^* {}_{(((4-1)*2)-1)*2}C_1 + {}_4C_2^* {}_{(4-2)*2}C_1^* {}_{(((4-2)*2)-1)*2}C_1 \ldots + {}_4C_3^* {}_{(4-3)*2}C_1^* {}_{(((4-3)*2)-1)*2}C_1 = 400$$

Accordingly, 583 combinations are possible and can be represented by 10 bits ($2^9 = 512 < 583 < 2^{10} = 1024$). Otherwise, the combinations may be represented by 9 bits except for the third case which is not frequently used.

Second Embodiment—Method of Using REs for CRS Transmission for a CSI-RS

Figure 10:
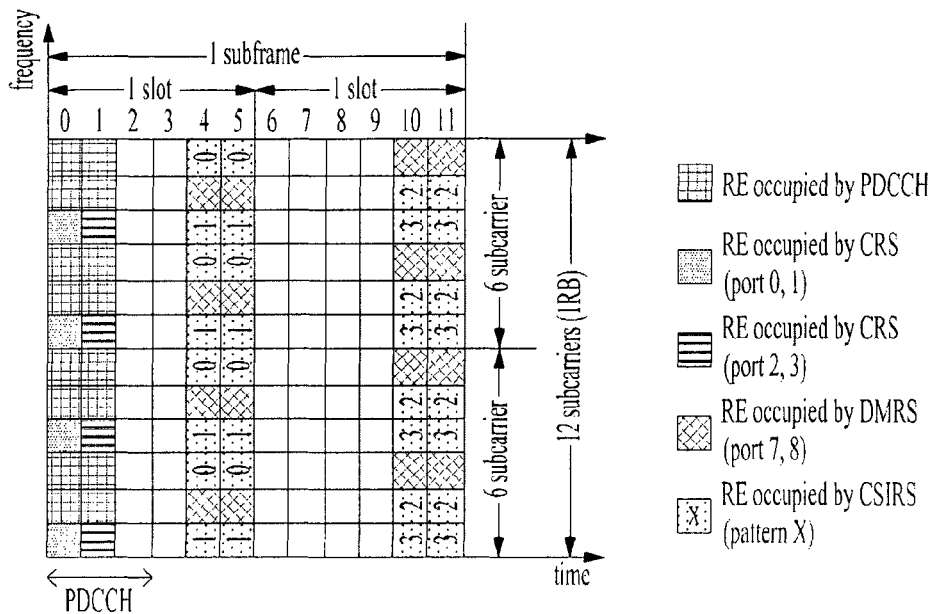
FIG. 10 illustrates a CRS pattern, a DMRS pattern, a PDCCH region and a CSI-RS pattern of an MBSFN (Multimedia Broadcast Single Frequency Network) subframe having an extended CP.

A description will be given of a method for increasing the number of CSI-RS antenna ports in a single subframe using REs which are generated when some antenna ports through which CRS is transmitted are not used for CRS transmission according to another embodiment of the present invention. In LTE Rel-8, a multimedia broadcast single frequency network (MBSFN) subframe is defined as a subframe for supporting a multimedia broadcast multicast system (MBMS). In the MBSFN subframe, a CRS is present in a PDCCH region and not present in a PDSCH region. In systems following Rel-9, the MBSFN subframe supports DMRS based unicast data transmission. FIG. 10 illustrates resource mapping when an MBSFN subframe is used for unicast data transmission.

In FIG. 10, CRS interference is not present in OFDM symbols #2, #3, #6, #7, #8 and #9 in an MBSFN subframe, differently from a normal subframe, and the number of CSI-RS antenna ports can be increased using PDSCH REs of the OFDM symbols.

Figure 11:
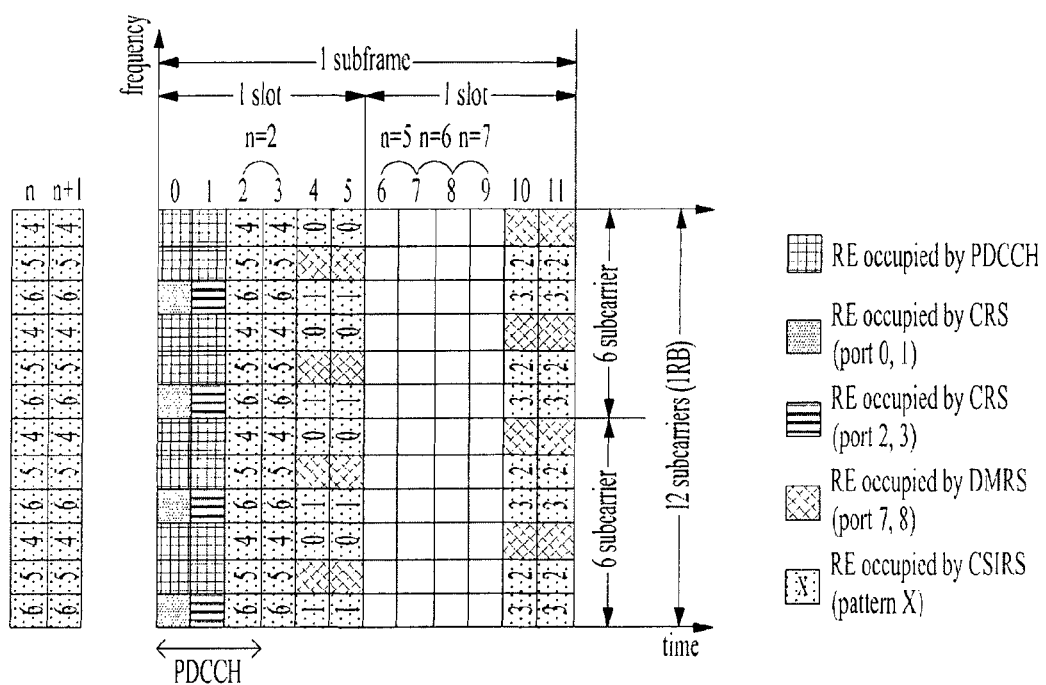
FIG. 11 illustrates a CSI-RS pattern of an MBSFN subframe having an extended CP according to an embodiment of the present invention.

An additional CSI-RS antenna port pattern obtained by increasing the number of CSI-RS antenna ports can be discriminated using an OCC for 2 OFDM symbols and can be extended to 8 antenna port patterns discriminated according to FDM. For example, 8 3-antenna port patterns (X=4, 5, 6) can be added, as shown in the left of FIG. 11, to 2 consecutive OFDM symbols, such as OFDM symbols #2 and #3 of the first slot, OFDM symbols #0 and #1, #1 and #2 or #2 and #3 of the second slot in a PRB pair illustrated in FIG. 10. The right of FIG. 11 illustrates the CSI-RS patterns added to OFDM symbols #2 and #3 of the first slot in a PRB pair.

While FIG. 11 illustrates 8 CSI-RS antenna port patterns, a 4-antenna port pattern or a 2-antenna port pattern can be equally applied to the 8 antenna port pattern, as illustrated in FIG. 8. That is, 8 antenna port patterns can be regarded as 2 4-antenna port patterns or 4 2-antenna port patterns. Here, some of the additional CSI-RS patterns may not be used due to DMRS extension in massive MIMO.

As illustrated in FIG. 11, CSI-RS patterns added to OFDM symbols #2 and #3, #6 and #7, #7 and #8 and #8 and #9 in a PRB pair may be used only to support CSI-RS transmission through 33 or more CSI-RS antenna ports. In this case, the embodiment described with reference to FIG. 9 can be used for CSI-RS transmission through 32 or fewer CSI-RS antenna ports.

Third Embodiment—Method of Using Existing DMRS REs for a CSI-RS

A description will be given of a method for increasing the number of CSI-RS antenna ports using existing REs for DMRSs according to another embodiment of the present invention. While the above-described method for extending a CSI-RS antenna port pattern in an MBSFN subframe can easily remarkably increase the number of CSI-RS antenna ports according to characteristics of the MBSFN subframe that does not transmit a CRS, Rel-8 UEs may not be supported in the MBSFN subframe. Accordingly, a method for extending a CSI-RS antenna port pattern in a normal subframe also needs to be considered. As can be seen from FIG. 8, CRS interference is applied to OFDM symbols #3 of the first slot and OFDM symbols #0, #1 and #3 of the second slot in a PRB pair and thus it is not desirable to allocate REs of the OFDM symbols to CSI-RS resources. Furthermore, it is impossible to add a CSI-RS pattern similar to an existing CSI-RS pattern present in 2 OFDM symbols to OFDM symbol #2 of the second slot in the PRB pair because resources to which a time domain OCC can be applied are not present before and after the OFDM symbol #2 although the OFDM symbol #2 is not affected by CRS interference.

Figure 12:
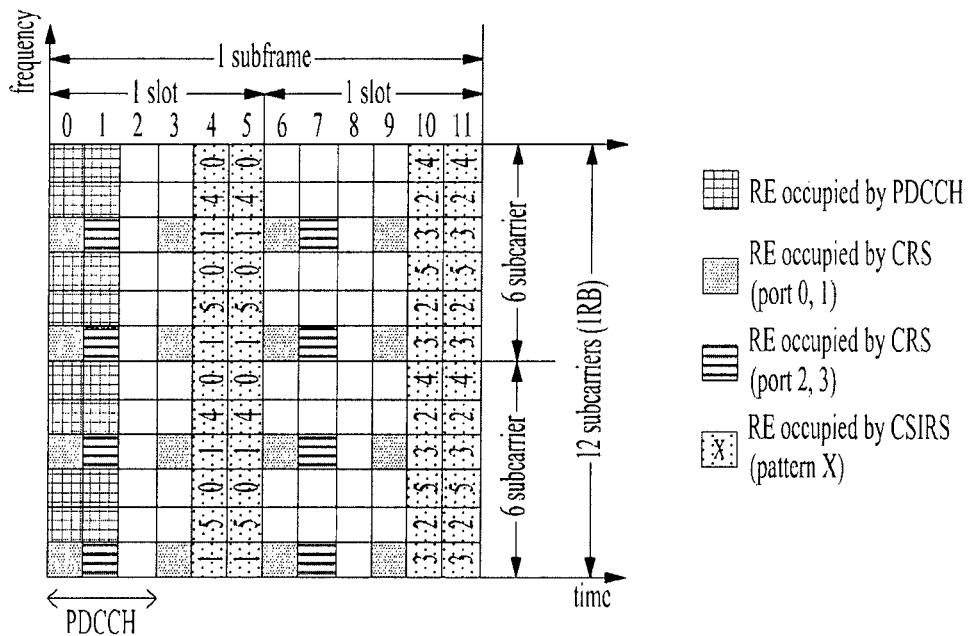
FIG. 12 illustrates a CSI-RS pattern of a normal downlink subframe having an extended CP according to an embodiment of the present invention.

Therefore, the present invention proposes a method for allocating REs for DMRSs to CSI-RSs in the above-described environment. Here, a network can instruct a UE to perform CRS based data transmission and reception, for example, fallback operation according to DCI format 1A and use REs for DMRSs as additional CSI-RS patterns in a corresponding subframe. Furthermore, the network may signal information on the subframe in which the REs for DMRSs are used for CSI-RS pattern extension to the UE through a signal of a higher layer such as RRC. FIG. 12 illustrates a method for adding 2 8-antenna port patterns (e.g. 4 and 5) using REs for DMRSs.

As described with reference to FIG. 12, CSI-RS patterns added to OFDM symbols #4 and #5 and #10 and #11 in a PRB pair may be used only to support CSI-RS transmission through 33 or more CSI-RS antenna ports. In this case, the embodiment described with reference to FIG. 9 can be used for CSI-RS transmission through 32 or fewer CSI-RS antenna ports.

Fourth Embodiment—Method of Using REs for a PDSCH for a CSI-RS

A description will be given of a method for adding CSI-RS resources, whose antenna ports are discriminated by CDM resources in the frequency domain, to OFDM symbols for a PDSCH according to another embodiment of the present invention. Referring to FIG. 8, interference according to a CRS is not present in OFDM symbol #2 of the second slot in the PRB pair. Accordingly, a method of adding CSI-RS resources in OFDM symbol #2 of the second slot can be considered. However, while an OCC is applied to CSI-RSs for 2 OFDM symbols in the time domain, it may be desirable to obtain CDM resources in the frequency domain, which correspond to OFDM symbol #2 of the second slot, by applying an OCC to 2 subcarriers in the frequency domain, as illustrated in FIG. 13, instead of acquiring CDM resources in the time domain because CRS interference may be present in OFDM symbols adjacent to OFDM symbol #2 of the second slot.

Figure 13:
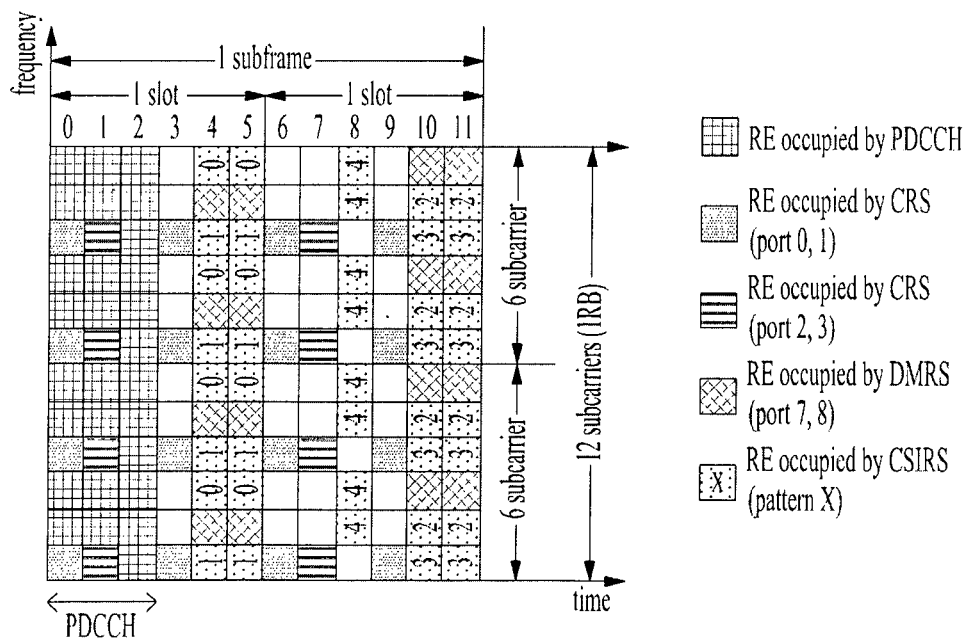
FIG. 13 illustrates a CSI-RS pattern of a normal downlink subframe having an extended CP according to an embodiment of the present invention.
Figure 14:
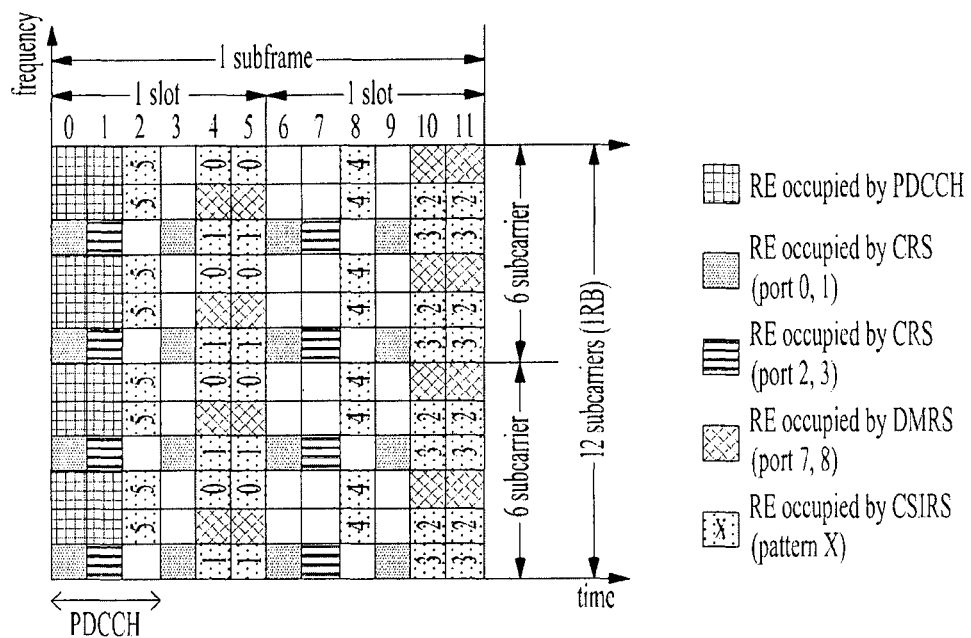
FIG. 14 illustrates a CSI-RS pattern of a normal downlink subframe having an extended CP according to an embodiment of the present invention.

FIG. 14 illustrates an example of limiting the length of a PDCCH region to 2 OFDM symbols and adding CSI-RS resources, whose antenna ports are discriminated by CDM resources in the frequency domain, in FIG. 13.

Figure 15:
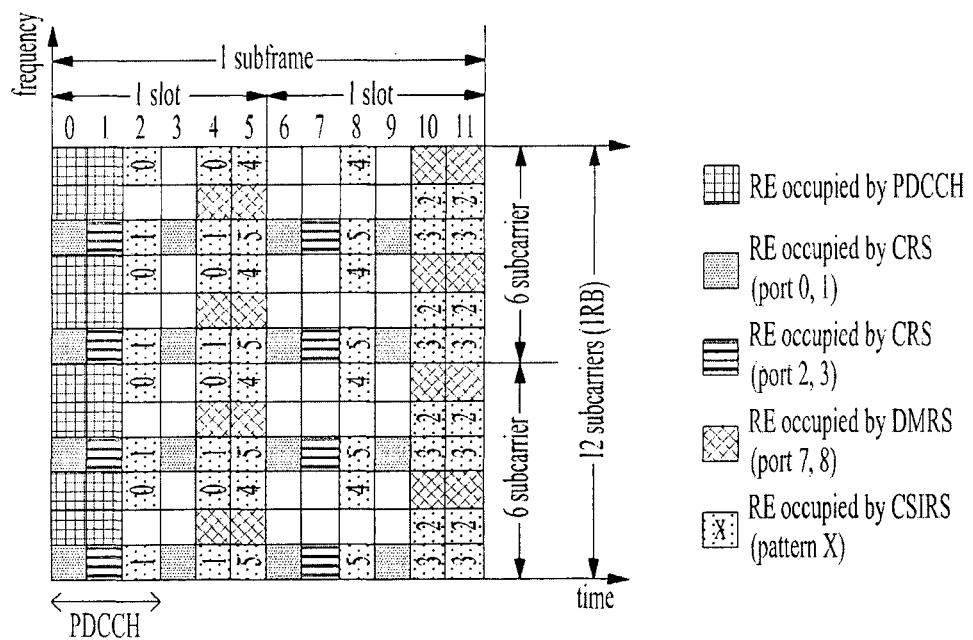
FIG. 15 illustrates a CSI-RS pattern of a normal downlink subframe having an extended CP according to an embodiment of the present invention.

In FIG. 14, a UE needs to consider both the time domain OCC and frequency domain OCC due to introduction of frequency domain CDM and thus complexity may increase. Accordingly, when the length of a PDCCH region is limited to 2 OFDM symbols as illustrated in FIG. 14, a method of applying an OCC to non-consecutive OFDM symbols, illustrated in FIG. 15, may be considered. While a CSI-RS pattern shown in FIG. 15 does not have the nested property of the existing CSI-RS pattern, such CSI-RS pattern reduces complexity since a UE considers only a time domain OCC for CSI-RSs.

Fifth Embodiment—Method of Using Existing REs for CSI-RSs in Multiple Subframes

A description will be given of a method for increasing the number of CSI-RS antenna ports by configuring multiple CSI-RS resources and correcting a phase difference between multiple CSI-RS resources according to another embodiment of the present invention. CSI-RS provided by LTE Rel-10 supports 1, 2, 4 or 8 antenna ports. Here, when a CSI-RS resource for N (>8) antenna ports needs to be allocated, a method of allocating multiple CSI-RS resources corresponding to N or more antenna ports can be considered.

For example, when a CSI-RS resource having 12 antenna ports is needed, a CSI-RS resource having 8 antenna ports and a CSI-RS resource having 4 antenna ports can be configured. Here, the network needs to inform a UE that the two CSI-RS resources are transmitted through the same transmission path. For example, the network can inform the UE that the two CSI-RS resources are quasi-collocated such that the UE can be implicitly aware that the two CSI-RS resources are CSI-RS resources for additional antenna ports. However, when the two CSI-RS resources are not transmitted in the same subframe all the time, the CSI phase estimated from each CSI-RS resource is corrected for corresponding antenna ports only and a phase difference between the two CSI-RS resources may not be reflected therein. Accordingly, the network needs to allow the UE to additionally feed back information on the phase difference between the two CSI-RS resources.

Those skilled in the art will readily recognize that at least two of the above-described embodiments can be combined.

Figure 16:
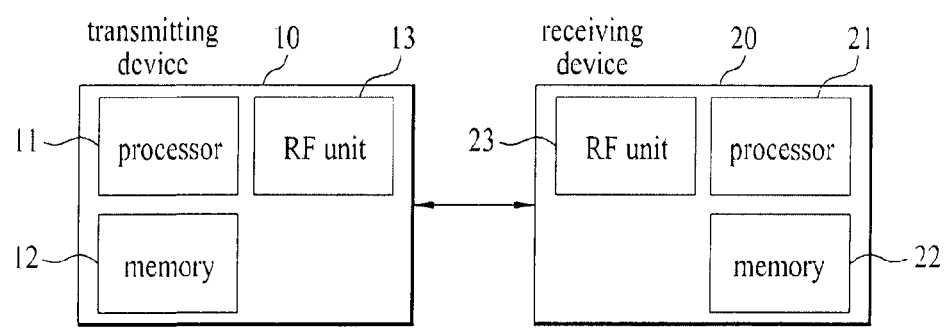
FIG. 16 is a block diagram of a device for implementing the embodiment(s) of the present invention.

FIG. 16 is a block diagram of a transmitting device 10 and a receiving device 20 configured to implement exemplary embodiments of the present invention. Referring to FIG. 16, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

While the embodiments of the present invention have been described focusing on a receiving device operating on an uplink, the embodiments may be applied to a receiving device operating on a downlink The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used for wireless communication systems such as a UE, a relay, an eNB, etc.

The invention claimed is:
1. A method for transmitting a channel state information reference signal (CSI-RS) in a specific downlink subframe having an extended cyclic prefix (CP) in a wireless communication system, the method comprising:
generating, by a base station, a CSI-RS sequence for an additional CSI-RS and mapping the generated CSI-RS sequence to CSI-RS complex-valued modulation symbols; and
mapping, by the base station, the CSI-RS complex-valued modulation symbols to a first CSI-RS resource element (RE) mapping pattern set composed of a plurality of CSI-RS RE mapping patterns and a second CSI-RS RE mapping pattern set composed of a plurality of CSI-RS RE mapping patterns; and
transmitting, by the base station to a user equipment (UE), the CSI-RS complex-valued modulation symbols mapped to the first and second CSI-RS RE mapping pattern sets as the additional CSI-RS using more than eight antenna ports when a specific downlink control information format is configured,
wherein the CSI-RS RE mapping patterns are composed of REs to which CSI-RS complex-valued modulation symbols are mapped,
wherein the first CSI-RS RE mapping pattern set is positioned in fifth and sixth orthogonal frequency division multiplexing (OFDM) symbols of each slot of a physical resource block (PRB) pair in the subframe,
wherein each CSI-RS RE mapping pattern of the first CSI-RS RE mapping pattern set includes REs with 2 consecutive OFDM symbol indices from among REs with specific subcarrier indices k of each slot, the specific subcarrier indices k corresponding to 0, 2, 3, 5, 6, 8, 9 and 11 in a first slot and to 0, 1, 3, 4, 6, 7, 9 and 10 in a second slot,
wherein the second CSI-RS RE mapping pattern set is positioned in fifth and sixth OFDM symbols of each slot of a PRB pair in the subframe, and
wherein each CSI-RS RE mapping pattern of the second CSI-RS RE mapping pattern set includes REs with 2 consecutive OFDM symbol indices from among REs with specific subcarrier indices k of each slot, the specific subcarrier indices k corresponding to 1, 4, 7 and 10 in a first slot and to 2, 5, 8 and 11 in a second slot.

2. The method according to claim 1, wherein the first CSI-RS RE mapping pattern set and the second CSI-RS RE mapping pattern set are composed of a plurality of 8-antenna port CSI-RS RE mapping patterns, a plurality of 4-antenna port CSI-RS RE mapping patterns and a plurality of 1- or 2-antenna port CSI-RS RE mapping patterns, and the CSI-RS complex-valued modulation symbols are mapped to at least one of the plurality of 8-port patterns, the plurality of 4-port patterns and the plurality of 1- or 2-port patterns.

3. The method according to claim 1, further comprising:
mapping, by the base station, the second CSI-RS RE mapping pattern set composed of a plurality of CSI-RS RE mapping patterns to transmit an additional CSI-RS to the UE using more than eight antenna ports when 2 OFDM symbols are used for a control region of the subframe,
wherein the second CSI-RS RE mapping pattern set is positioned in third and fourth OFDM symbols of the first slot of a PRB pair in the subframe and at least 2 consecutive OFDM symbols from among sixth to ninth OFDM symbols of the second slot of the PRB pair, and
wherein each CSI-RS RE mapping pattern of the second CSI-RS RE mapping pattern set includes REs with 2 consecutive OFDM symbol indices in all subcarriers of each slot.

4. The method according to claim 1, further comprising: transmitting, by the base station, information on the subframe to the UE.

5. The method according to claim 1, further comprising: transmitting, by the base station, information on CSI RS RE mapping patterns to which the CSI-RS complex-valued modulation symbols are mapped to the UE.

6. The method according to claim 1, wherein the first CSI-RS RE mapping pattern set is used for CSI-RS transmission through 32 or fewer antenna ports.

7. The method according to claim 1, wherein the second CSI-RS RE mapping pattern set is used for CSI-RS transmission through 33 or more antenna ports.

8. The method according to claim 1, further comprising: transmitting, by the base station, information on the number of CSI-RS antenna ports used for CSI-RS transmission to the UE.

9. A method for receiving a channel state information reference signal (CSI-RS) in a specific downlink subframe having an extended cyclic prefix (CP) in a wireless communication system, the method comprising:
receiving, by a user equipment (UE), an additional CSI-RS corresponding to CSI-RS complex-valued modulation symbols mapped to a first CSI-RS resource element (RE) mapping pattern set composed of a plurality of CSI-RS RE mapping patterns and a second CSI-RS RE mapping pattern set composed of a plurality of CSI-RS RE mapping patterns, the additional CSI-RS being transmitted by a base station using more than eight antenna ports when a specific downlink control information format is configured,
wherein the CSI-RS RE mapping patterns are composed of REs to which CSI-RS complex-valued modulation symbols are mapped and a CSI-RS sequence for the additional CSI-RS is mapped to the CSI-RS complex-valued modulation symbols,
wherein the first CSI-RS RE mapping pattern set is positioned in fifth and sixth orthogonal frequency division multiplexing (OFDM) symbols of each slot of a physical resource block (PRB) pair in the subframe,
wherein each CSI-RS RE mapping pattern of the first CSI-RS RE mapping pattern set includes REs with 2 consecutive OFDM symbol indices from among REs with specific subcarrier indices k of each slot, the specific subcarrier indices k corresponding to 0, 2, 3, 5, 6, 8, 9 and 11 in a first slot and to 0, 1, 3, 4, 6, 7, 9 and 10 in a second slot,
wherein the second CSI-RS RE mapping pattern set is positioned in fifth and sixth OFDM symbols of each slot of a PRB pair in the subframe, and
wherein each CSI-RS RE mapping pattern of the second CSI-RS RE mapping pattern set includes REs with 2 consecutive OFDM symbol indices from among REs with specific subcarrier indices k of each slot, the specific subcarrier indices k corresponding to 1, 4, 7 and 10 in a first slot and to 2, 5, 8 and 11 in a second slot.

10. An evolved-Node B (eNB) configured to transmit a channel state information reference signal (CSI-RS) in a specific downlink subframe having an extended cyclic prefix (CP) in a wireless communication system, the eNB comprising:
a radio frequency (RF) unit; and
a processor configured to control the RF unit,
wherein the processor is configured to:
generate a CSI-RS sequence an additional CSI-RS, to map the CSI-RS sequence to CSI-RS complex-valued modulation symbols,
map the CSI-RS complex-valued modulation symbols to a first CSI-RS resource element (RE) mapping pattern set composed of a plurality of CSI-RS RE mapping patterns and a second CSI-RS RE mapping pattern set composed of a plurality of CSI-RS RE mapping patterns, and
transmit the CSI-RS complex-valued modulation symbols mapped to the first and second CSI-RS RE mapping pattern sets as the additional CSI-RS to a user equipment (UE) using more than eight antenna ports when a specific downlink control information format is configured,
wherein the CSI-RS RE mapping patterns are composed of REs to which CSI-RS complex-valued modulation symbols are mapped,
wherein the first CSI-RS RE mapping pattern set is positioned in fifth and sixth orthogonal frequency division multiplexin (OFDM) symbols of each slot of a physical resource block (PRB) air in the subframe,
wherein each CSI-RS RE mapping pattern of the first CSI-RS RE mapping pattern set includes REs with 2 consecutive OFDM symbol indices from among REs with specific subcarrier indices k of each slot, the specific subcarrier indices k corresponding to 0, 2, 3, 5, 6, 8, 9 and 11 in p first slot and to 0, 1, 3, 4, 6, 7, 9 and 10 in a second slot,
wherein the second CSI-RS RE mapping pattern set is positioned in fifth and sixth OFDM symbols of each slot of a PRB pair in the subframe, and
wherein each CSI-RS RE mapping pattern of the second CSI-RS RE mapping pattern set includes REs with 2 consecutive OFDM symbol indices from among REs with specific subcarrier indices k of each slot, the specific subcarrier indices k corresponding to 1, 4, 7 and 10 in a first slot and to 2, 5, 8 and 11 in a second slot.

11. A user equipment (UE) configured to receive a channel state information reference signal (CSI-RS) in a specific downlink subframe having an extended CP in a wireless communication system, the UE comprising:
a radio frequency (RF) unit; and
a processor configured to control the RF unit,
wherein the processor is configured to receive an additional CSI-RS corresponding to CSI-RS complex-valued modulation symbols mapped to a first CSI-RS resource element (RE) mapping pattern set composed of a plurality of CSI-RS RE mapping patterns and a second CSI-RS RE mapping pattern set composed of a plurality of CSI-RS RE mapping patterns, the additional CSI-RS being transmitted by a base station using more than eight antenna ports when a specific downlink control information format is configured,
wherein the CSI-RS RE mapping patterns are composed of REs to which CSI-RS complex-valued modulation symbols are mapped and a CSI-RS sequence for the additional CSI-RS is mapped to the CSI-RS complex-valued modulation symbols,
wherein the first CSI-RS RE mapping pattern set is positioned in fifth and sixth orthogonal frequency division multiplexing (OFDM) symbols of each slot of a physical resource block (PRB) pair in the subframe,
wherein each CSI-RS RE mapping pattern of the first CSI-RS RE mapping pattern set includes REs with 2 consecutive OFDM symbol indices from among REs with specific subcarrier indices k of each slot, the specific subcarrier indices k corresponding to 0, 2, 3, 5, 6, 8, 9 and 11 in a first slot and to 0, 1, 3, 4, 6, 7, 9 and 10 in a second slot, wherein the second CSI-RS RE mapping pattern set is positioned in fifth and sixth OFDM symbols of each slot of a PRB pair in the subframe, and wherein each CSI-RS RE mapping pattern of the second CSI-RS RE mapping pattern set includes REs with 2 consecutive OFDM symbol indices from among REs with specific subcarrier indices k of each slot, the specific subcarrier indices k corresponding to 1, 4, 7 and 10 in a first slot and to 2, 5, 8 and 11 in a second slot.

* * * * *